United States Patent

Dewenter et al.

[11] Patent Number: 6,165,948
[45] Date of Patent: Dec. 26, 2000

[54] METHOD FOR DRYING OUT ROCK CONTAINING IMMOBILE FORMATION WATER WITHIN THE ENCROACHMENT AREA OF NATURAL GAS DEPOSITS AND GAS RESERVOIRS

[75] Inventors: Wendelin Dewenter, Warburg; Kai-Udo Sewe, Barnstorf; Willibald Burger, Burghausen; Michael Geck, Burghausen; Ludwig Esterbauer, Burghausen, all of Germany

[73] Assignee: Wacker-Chemie GmbH, Munich, Germany

[21] Appl. No.: 09/319,747

[22] PCT Filed: Dec. 18, 1997

[86] PCT No.: PCT/EP97/07104

§ 371 Date: Jun. 10, 1999

§ 102(e) Date: Jun. 10, 1999

[87] PCT Pub. No.: WO98/27314

PCT Pub. Date: Jun. 25, 1998

[30] Foreign Application Priority Data

Dec. 19, 1996 [DE] Germany ............................ 196 53 140

[51] Int. Cl.[7] .............................. E21B 21/06; E21B 43/16
[52] U.S. Cl. ......................... 507/233; 507/234; 507/927; 507/928; 166/305.1
[58] Field of Search ..................................... 507/233, 234, 507/927, 928; 166/305.1

[56] References Cited

U.S. PATENT DOCUMENTS

| | | | |
|---|---|---|---|
| 3,552,493 | 1/1971 | Bezemer | 166/295 |
| 3,653,442 | 4/1972 | Ross . | |
| 3,682,831 | 8/1972 | Tate . | |
| 4,074,536 | 2/1978 | Young . | |
| 4,427,556 | 1/1984 | House et al. | 507/110 |
| 5,051,197 | 9/1991 | Kalfayan et al. . | |
| 5,168,930 | 12/1992 | Wiseman et al. . | |
| 5,346,013 | 9/1994 | Pusch et al. . | |
| 5,368,102 | 11/1994 | Dewprashad et al. | 166/276 |
| 5,374,361 | 12/1994 | Chan | 507/211 |

FOREIGN PATENT DOCUMENTS

| | | |
|---|---|---|
| 0 707 134 | 4/1996 | European Pat. Off. . |
| 1 021 528 | 3/1966 | United Kingdom . |

*Primary Examiner*—Jill Warden
*Assistant Examiner*—Latoya I. Cross
*Attorney, Agent, or Firm*—Brooks & Kushman P.C.

[57] ABSTRACT

The invention relates to a process for drying out rock containing immobile formation water in the intake radius of natural gas wells and gas storage wells which deliver less than 50 l of water per 1000 $m^3$ (S.T.P.) of natural gas produced, in which a dispersion comprising the components A) a water-repellent active compound, B) hydrophilic water-miscible dispersion medium, with or without C) a dispersant renders the water-containing rock hydrophobic.

8 Claims, No Drawings

METHOD FOR DRYING OUT ROCK CONTAINING IMMOBILE FORMATION WATER WITHIN THE ENCROACHMENT AREA OF NATURAL GAS DEPOSITS AND GAS RESERVOIRS

This application is a 371 of PCT/EP97/07104, filed on Dec. 18,1997.

The invention relates to a process for drying out rock containing immobile formation water in the intake radius of natural gas wells and gas storage wells, in which water-repellent active compound in dispersed form renders the water-containing rock hydrophobic.

In the vicinity of production wells in natural gas fields, formation water in the pore cavities of the rock prevents the flow of gas to the production well. If the formation water has a high salt content, the evaporation of water causes the solubility limit to be exceeded, and in particular chloride salts crystallize out. Since salt water is continuously drawn into the pore cavities by capillary forces, the salt crystals constantly grow until the flow channels are closed to the point of impermeability to natural gas.

Salt deposits occur not only in the pore cavities, but also form on well casings and other pipes, and on storage and further processing facilities, such as piping, valves, heating coils and heating tubes and separators, which are involved with handling the gas produced and the formation water which is separated off. When a deposit forms, the extraction rate decreases and finally the entire operation ceases. Furthermore, the heat transfer is decreased.

The customary process for enhancing the productivity of natural gas wells is the hydraulic generation and stabilization of fractures in the vicinity of the well. The additional drainage areas produced by this means and the high gas flux density in the fractures leads to an elevated production rate of the well. However, this process is highly expensive. Fracture formation can be controlled only to a very restricted extent.

The salt deposits, in particular chloride salts, can be eliminated by flushing with fresh water. Since the salt deposits continue to reform, these flushing operations must be carried out at regular intervals, which causes frequent losses of production.

A process for removing salt deposits in wells is described in U.S. Pat. No. 5,051,197. There, the wells are treated with an aqueous composition of aminopolycarboxylic acid and water-soluble organosilane. However, water-soluble organosilanes generally have a high volatility and a low flashpoint, hydrolyze rapidly and release toxic and highly flammable products in the presence of water. Thus, chlorosilanes form HCl, methoxysilanes form methanol and ethoxysilanes form ethanol. Therefore, these compositions can only be kept for a short time and are difficult to handle. In addition, a process for removing salt deposits is described here, and not a process for preventing salt deposits.

A process for preventing salt deposits in wells is described in U.S. Pat. No. 3,682,831. There, the wells are treated with water-soluble glycol-silicone copolymers which contain SiOC bonds which are highly sensitive to hydrolysis. However, the action of this process is too poor.

U.S. Pat. No. 3,653,442 describes a process for removing water by means of micellar dispersions, which achieves the increase in gas or oil flow through removal of a water block.

Database WPI, week 9311, AN-93-091996 and SU-A-1 724 854 describe a seating material for natural gas and oil boreholes which is claimed to block mobile ingressing water.

U.S. Pat. No. 4,074,536 describes a process for hydrophobicizing rock formations using organosilicon compounds with regard to preparation of the rock and prevention of dissolution of the rock in the presence of water.

The object was therefore to provide a means which drys out immobile formation water in the rock and which provides durable prevention of salt deposits in the pore cavities of the rock in the vicinity of natural gas production wells in natural gas fields.

The water-repellent active compounds (A) used according to the invention are readily dispersible in the formation water and can therefore be distributed homogeneously over the entire rock surface and then break there. By this means, the water-repellent active compounds (A) cover the rock surface in a very thin layer.

If natural gas is then produced, decreasing the gas field pressure causes additional uptake of water in the natural gas. Since, in the vicinity of the well, in the rock zone rendered hydrophobic, the capillary action for water is greatly decreased, the treated region gradually dries out by evaporation of the water.

The drying out of the rock improves the gas permeability, since gas can then again flow through the entire pore cavity without hindrance by water. Since, at the same capillary pressure, the water saturation in low-permeability rock having narrow capillaries is greater than in high-permeability rock, the process is particularly suitable for gas fields of low permeability. In addition, in the case of heterogeneous gas field rock having variable permeability, use of the process leads to homogenization of the flow profile in the vicinity of the well.

Drying out the rock in the vicinity of the well prevents blockage of the rock capillaries, and prevents salt deposits on equipment for production, storage and further processing.

The process has significantly lower costs in comparison with hydraulic generation of fractures in the vicinity of the well. The process requires lower injection pressures and leads to a considerably lower risk of damaging the well. Wells treated by fracture formation can have a supplementary treatment with the process according to the invention. Wells whose equipment is not suitable for hydraulic generation of fractures can also be treated by the process according to the invention.

The dispersion is chemically inert to the rocks and salt solutions present in the gas fields, the natural gas and the production equipment.

The water-repellent active compound (A) is preferably soluble to at most 1% by weight, in particular to at most 0.1% by weight, in water at 20° C.

In the process according to the invention, as water-repellent substances (A), use can be made of, for example, inorganic substances which have been rendered hydrophobic or unfluorinated or fluorinated waxes, paraffins, carboxylic salts, organic or organosilicon polymeric compounds.

Examples of suitable inorganic substances which have been rendered hydrophobic are pyrogenic and precipitated silicic acid and silicon/aluminum mixed oxides. Said inorganic substances can be rendered hydrophobic, for example, by treatment with organosilanes or organosiloxanes or by etherification of hydroxyl groups to give alkoxy groups. Preference is given to pyrogenic and precipitated silicic acids, since these are readily dispersible.

Suitable waxes are, for example, natural waxes, such as vegetable waxes, e.g. candellila and carnauba wax; animal waxes, e.g. beeswax and lanolin; mineral waxes, e.g. ceresin and ozokerite; chemically modified natural, in particular fluorinated, waxes and synthetic waxes, e.g. polyethylene waxes and silicone waxes.

Suitable carboxylic salts are, in particular, the salts of monobasic or polybasic carboxylic acids having 8 to 50 carbon atoms per carboxyl group. Preference is given to the salts of fluorinated carboxylic acids, in particular when these have a perfluoroalkyl radical having at least 4 carbon atoms. Examples of preferred monobasic fluorinated carboxylic salts are the alkali metal salts of arylcarboxylic acids, such as benzoic acids or naphthoic acids having one or two perfluoroalkyl radicals having preferably 4 to 18 carbon atoms.

Fluorinated organic polymeric compounds which can be used in the process according to the invention are, for example, all compounds of the type which also have been able to be used or have been used hitherto for rendering organic substances water repellent, such as organic fibers, and inorganic substances. Examples of compounds of this type are polymers which have been prepared from at least partly fluorine-containing monomers, such as polytetrafluoroethylene, copolymers of tetrafluoroethylene and hexafluoropropylene, poly(vinyl fluoride), poly (vinylidene fluoride), polytrifluorochloroethylene, copolymers of trifluorochloroethylene and other monomers, such as vinylidene fluoride, vinyl chloride, vinyl acetate, methyl methacrylate or styrene; and fluorinated acrylic resins, such as homopolymers and copolymers of perfluoroalkyl-containing acrylic and methacrylic esters with acrylic acid and methacrylic acid and their derivatives.

Preferred examples of fluorinated acrylic resins are poly (1,1-dihydroperfluorobutyl acrylate) and mixed polymers of n-butyl acrylate, N-methylol acrylamide and at least 35% by weight of 1,1,2,2-tetrahydroperfluoro-$C_1$ to $C_{16}$-alkyl methacrylate having a linear alkyl chain.

Further examples of fluorinated acrylic resins of this type are the alkali metal salts of the copolymers of the above listed acrylates, methacrylates, acrylic acid and methacrylic acid which preferably have a fluorine content of at least 20% by weight.

Other examples of fluorinated organic polymeric compounds are organic synthetic polymers which have been fluorinated after polymerization, such as poly(vinyl chloride), polyethylene, polypropylene, poly(vinyl acetate), poly(vinyl alcohol), polycarbonate, polyacrlate, polymethacrylate, poly(methyl methacrylate), polystyrene, polyacrylonitrile, poly(vinylidene chloride), poly(vinyl fluoride), poly(vinylidene fluoride), poly(vinylidene cyanide), polybutadiene, polyisoprene, polyethers, polyesters, polyamide, polyurethane, polyimide, silicones, polyvinylpyrrolidone, polyacrylamide, poly(ethylene glycol) and their derivatives which are fluorinated in the side chains or in the main chains. The polymers which have been fluorinated after polymerization preferably have a fluorine content of at least 10% by weight. Particular preference is given to polyurethane resins having a fluorine content of 25–35% by weight.

In particular, preference is given as water-repellent active compound (A) to organosilicon compounds, since these are thermally stable at temperatures of 130° C. and significantly above which frequently prevail in gas fields. The action on the rock surface rendering it hydrophobic persists for a long period.

Preferably, the organosilicon compound (A) is made up of units of the general formulae (I) to (VII)

| | |
|---|---|
| $R_3SiO_{1/2}$, | (I) |
| $R_2SiO$, | (II) |
| $RSiO_{3/2}$, | (III) |
| $SiO_{4/2}$, | (IV) |
| $R_2(R'O)SiO_{1/2}$, | (V) |
| $R(R'O)SiO$, | (VI) |
| $R'OSiO_{3/2}$, | (VII) | where
R denotes monovalent hydrocarbon radicals having 1 to 18 carbon atoms, which are optionally substituted by halogen atoms, cyano, amino, alkylamino, quaternary ammonium, mercapto, epoxy, anhydrido, carboxylato, sulfonato, sulfato, phosphonato, isocyanato or polyoxyalkylene groups, R' denotes monovalent hydrocarbon radicals having 1 to 30 carbon atoms and hydrogen atoms, which are optionally substituted by halogen atoms, cyano, amino, alkylamino, quaternary ammonium, mercapto, epoxy, anhydrido, carboxylato, sulfonato, sulfato, phosphonato, isocyanato or polyoxyalkylene groups.

Examples of hydrocarbon radicals R and R' are alkyl radicals, such as methyl, ethyl, n-propyl, isopropyl, n-butyl, isobutyl, tert-butyl, n-pentyl, isopentyl, neopentyl and tert-pentyl; hexyl radicals, such as n-hexyl; heptyl radicals, such as n-heptyl; octyl radicals, such as n-octyl, and isooctyl radicals, such as 2,2,4-trimethylpentyl; nonyl radicals, such as n-nonyl; decyl radicals, such as n-decyl; dodecyl radicals, such as n-dodecyl; octadecyl radicals, such as n-octadecyl; alkenyl radicals, such as vinyl, allyl and 5-hexene-1-yl; cycloalkyl radicals, such as cyclopentyl, cyclohexyl, cycloheptyl and methylcyclohexyl; aryl radicals, such as phenyl, naphthyl, anthryl and phenanthryl; alkaryl radicals, such as o-, m-, p-tolyl, xylyl and ethylphenyl; aralkyl radicals, such as benzyl and alpha- and β-phenylethyl [sic].

Examples of substituted radicals R and R' are cyanoalkyl radicals, such as β-cyanoethyl [sic], and hydrocarbon radicals which have been halogenated by fluorine, chlorine or bromine atoms, for example haloalkyl radicals, such as 3,3,3-trifluoro-n-propyl, 2,2,2,2',2',2'-hexafluoroisopropyl, 8 heptafluoroisopropyl [sic], and haloaryl radicals, such as o-, m- and p-chlorophenyl.

Preferably, at least 90 mol% of the radicals R are methyl, ethyl or phenyl, in particular methyl.

Examples of polyoxyalkylene-substituted radicals R and R' are the radicals of the general formula (VIII)

(VIII)

where
- $R^1$ denotes a divalent $C_1$- to $C_6$- alkylene radical,
- $R^2$ denotes hydrogen atoms, or monovalent $C_1$- to $C_6$-hydrocarbon radicals,
- $R^3$ denotes hydrogen atoms, monovalent $C_1$- to $C_6$-hydrocarbon radicals, $C_1$-$C_8$-acyl radicals, ethyl ether radicals or silyl radicals,
- c denotes values 0, 1, 2, 3, 4 or 5, preferably 2 or 3 and
- d denotes integers from 1 to 100, preferably 1 to 10.

Examples of the divalent radicals $R^1$ are saturated linear or branched-chain or cyclic alkylene radicals, such as methylene and ethylene or propylene, butylene, pentylene, hexylene, 2-methylpropylene, cyclohexylene, or unsaturated alkylene radicals such as propenylene and hexenylene.

Examples of the monovalent radicals $R^2$ and $R^3$ are listed under the above examples for R and R'. Examples of acyl radicals are acetyl, of ethyl ether radicals tetrahydropyranyl, and of silyl radicals, trimethylsilyl.

Further examples of polyoxyalkylene-substituted radicals R and R' are the radicals of the general formula (IX)

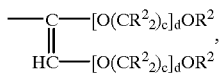
(IX)

where $R^2$, c and d have the meanings given above for the general formula (VIII).

Preferably, at most 20 mol% of the units of the organosilicon compound (A) have the general formulae (V) to (VII).

Preferably, the organosilicon compound (A) contains at least 50% by weight, in particular at least 80% by weight, of organopolysiloxanes (A1), which consist of at least 90 mol%, in particular 95 mol%, of units of the general formula (II). Furthermore, preference is given to the organopolysiloxane (A1) having an average viscosity of 5 to 2,000,000 mPa·s, in particular 350 to 60,000 mPa·s at 25° C.

Preferably, the organosilicon compound (A) contains at least 2% by weight, in particular at least 5% by weight, and preferably at most 70% by weight, of organopolysiloxane resins (A2) which consist of at least 90 mol%, in particular 95 mol%, of units of the general formulae (I), (IV) and (V). The organopolysiloxane resins (A2) can, for example, be solid at room temperature and exhibit 0.25 to 1.25 units of the general formula (I) per unit of the general formula (IV). These preferred organopolysiloxane resins (A2) can contain up to a total of 5% by weight of Si-bonded alkoxy radicals or hydroxyl groups resulting from their preparation. The organopolysiloxane resins (A2) are generally not completely miscible with polydimethylsiloxanes.

Although not cited in the general formulae (I) to (III), some of the radicals R can be replaced by hydrogen atoms directly bonded to silicon atoms. However, this is not preferred.

Although furthermore not cited in the general formulae (I) to (III), water-insoluble organosilanes can also be used as organosilicon compounds (A).

However, cross-linking organosilicon compounds (A) are also suitable. Thus, for example, aqueous siloxane dispersions which contain cross-linking siloxanes, can also be used. However, organosilicon compounds which spontaneously form a dispersion in the dispersion medium (B) without dispersants (C), so-called self-dispersing organosilicon compounds, in particular organopolysiloxanes, are also suitable.

Preferably, at least 10 parts by weight, in particular at least 50 parts by weight, of the hydrophilic water-miscible dispersion medium (B) are preferably miscible with 100 parts by weight of water. As hydrophilic water-miscible dispersion medium (B), preference is given to polar substances, for example aliphatic monoalcohols, such as methanol, ethanol, n-propanol and i-propanol, glycols, ethers, such as dioxane and tetrahydrofuran, dimethylformamide and, in particular, water.

Dispersants (C) which are suitable are a multiplicity of active compounds which are expediently classified into surface-active dispersants, such as nonionic, anionic, cationic and ampholytic dispersants, into partially surface-active dispersants, such as high-molecular-weight substances and natural products, and into dispersants generally having low surface activity, such as inorganic and special dispersion aids. An overview view is cited in Ullmans Encyklopädie der technischen Chemie [Ullmans Encyclopedia of Industrial Chemistry], Verlag Chemie Weinheim, 4th Edition 1975, Volume 10, pp. 449–473.

Preferably, the dispersant (C) is selected from the following dispersion aids below:

1. Alkyl sulfates, for example having a chain length of 8–18 C atoms, alkyl ether sulfates having 8 –18 C atoms in the hydrophobic radical and 1–40 ethylene oxide (EO) or propylene oxide (PO) units.

2. Sulfonates, e.g. alkyl sulfonates having 8–18 C atoms, alkylaryl sulfonates having 8–18 C atoms, esters and half esters of sulfosuccinic acid with monohydric alcohols or alkylphenols having 4–15 C atoms; if appropriate these alcohols or alkylphenols can also be ethoxylated with 1–40 EO units.

3. Alkali metal salts and ammonium salts of carboxylic acids and poly(alkylene glycol)ether carboxylic acids having 8–20 C atoms in the alkyl, aryl, alkaryl or aralkyl radical and 1–40 EO or PO units.

4. Partial phosphoric esters and their alkali metal salts and ammonium salts, e.g. alkyl and alkaryl phosphates having 8–20 C atoms in the organic radical, alkylether phosphates or alkarylether phosphates having 8–20 C atoms in the alkyl or alkaryl and 1–40 EO units.

5. Alkyl polyglycol ethers, preferably those having 2–40 EO units and alkyl radicals of 4–20 atoms.

6. Alkylaryl polyglycol ethers having 2–40 EO units and 8–20 C atoms in the alkyl and aryl radicals.

7. Ethylene oxide/propylene oxide (EO/PO) block copolymers having 8–40 EO or PO units.

8. Fatty acid polyglycol esters having 6–24 C atoms and 2–40 EO units.

9. Fatty esters of glycerol, sorbitol and pentaerythritol.

10. Alkylpolyglycosides of the general formula R""—O—$Z_c$, where R"" denotes a linear or branched, saturated or unsaturated alkyl radical having on average 8–24 C atoms and $Z_o$ denotes an oligoglycoside radical having on average o=1–10 hexose or pentose units or mixtures thereof.

11. Polar-group-containing linear organopolysiloxanes having alkoxy groups and up to 24 C atoms and/or up to 40 EO and/or PO groups.

12. Salts of primary, secondary and tertiary fatty amines having 8–24 C atoms with acetic acid, sulfuric acid, hydrochloric acid and phosphoric acids.

13. Quaternary alkyl- and alkylbenzylammonium salts, whose alkyl groups have 1–24 C atoms, in particular the halides, sulfates, phosphates, acetates and hydroxides.

14. Alkylpyridinium, alkylimidazolinium and alkyloxazolinium salts whose alkyl chain has up to 18 C atoms, especially in the form of their halides, sulfates, phosphates and acetates.

15. High-molecular-weight substances such as polymers, e.g. poly(vinyl alcohol) and mixed polymers, such as vinylacetate/ethylene polymers.

16. Natural substances and their conversion products, such as polysaccharides or cellulose and cellulose derivatives, such as cellulose ethers.

A dispersant, or else mixtures of a plurality of dispersants, can be used.

Dispersants which are particularly preferred are the dispersants listed above under 1, 2, 3, 5, 6, 7 and 8, 12, 13, 15, 16, in particular the dispersants listed under 2, 3, 5, 6 and 13.

Preferably, 2.5 to 250, preferably 5 to 150, in particular 10 to 70, parts by weight of dispersant (B) are used per 100 parts by weight of water-repellent active compound (A).

As additives (D), the dispersion can contain, for example, fillers, fungicides, bactericides, algicides, biocides, odorants, corrosion inhibitors, native oils, thickeners, crosslinking agents, cosurfactants and organic solvents.

The dispersions may contain small amounts of organic solvents depending on the preparation method. In particular in the case of the preparation of organopolysiloxane resins, organic solvents or native oils are frequently used. If the dispersion contains organic solvents, their content is preferably at most 50 parts by weight, in particular 5 to 20 parts by weight, based on 100 parts by weight of water-repellent active compound (A).

The content of filler is preferably up to 20 parts by weight, in particular 2 to 8 parts by weight per 100 parts by weight of water-repellent active compound (A).

The preparation of the dispersions is known to those skilled in the art.

For the ready-to-use dispersion, the sum of the components water-repellent substances (A), dispersion medium (B), dispersants (C) and, if appropriate, additives (D) is preferably 0.01 to 25% by weight, particularly preferably 0.05 to 10% by weight, in particular 0.1 to 2% by weight, based on the weight of the dispersion used.

The mean particle size of the dispersion is preferably at most 1000 $\mu$m, in particular 5 nm to 250 $\mu$m.

The compositions, particle sizes and concentrations of the dispersions can be matched to the types of rock and conditions, such as temperature and salt content, prevailing in the gas fields, so that the dispersions are injectable even under extreme conditions. The particle size is preferably selected in such a manner that the pore size of the rock is not reached. By means of the high content of the components water-repellent substances (A), dispersion medium (B), dispersant (C) and, if appropriate, additives (D) in the dispersion, the dispersion medium introduced into the rock can be kept small. The concentration of the dispersion can be matched to rock properties, such as permeability and depth of penetration. In the case of high permeabilities, smaller amounts of more coarsely disperse dispersions having higher contents of the components water-repellent substances (A), dispersion medium (B), dispersant (C) and, if appropriate, additives (D) can be used. In the case of low rock permeabilities, greater amounts of finely dispersed dispersions having lower concentration are used.

Substances are also suitable which do not form a water-repellent substance (A) in a dispersion medium (B) in which they were previously soluble until use conditions are achieved. Examples of these which may be mentioned are nonionic surfactants or glycol-functional silicone oils, which are soluble in polar dispersion media such as water, but then, at elevated temperatures, reach a cloud point and become water-repellent.

The water present in the natural gas is principally condensation water. Preferably, the natural gas wells and gas-storage wells treated by the present process deliver at most 40, in particular at most 20, 1 of water per 1000 m$^3$ (S.T.P.) of natural gas produced.

In the examples below, unless stated otherwise,
a) all amounts given are based on weight;
b) all pressures are 0.1013 MPa (absolute);
c) all temperatures are 20° C.;
d) the following abbreviations have been used
   dem. demineralized
   PDMS polydimethylsiloxane
   Me methyl radical;
   S.T.P. (volume at) standard temperature and pressure (0° C., 0.1013 MPa (absolute))
e) the amine number has been given as the number of ml of 1 N HCl which are necessary to neutralize 1 g of organopolysiloxane.

EXAMPLES

The examples below were carried out on sample cores of the middle mottled sandstone of the gas field in Barrien, northern Germany. The cylindrical sample cores had lengths and diameters of 3 cm each.

Examples 1 to 5

The following measures were carried out with the sample cores:
a) The sample cores were dried overnight at 90° C.
b) The dry sample cores were placed in a vacuum-tight container and the container was evacuated. When vacuum was reached, the container was isolated from the vacuum pump by closing a valve and dem. water was drawn into the container via a second connection. After the sample cores were completely immersed in dem. water, the container was vented.
The sample cores were weighed to determine $m_V$.
c) The sample cores were dried overnight at 90° C. and then weighed to determine $m_1$.
d) The dry sample cores were each rolled up in one absorbent filter paper strip of width 7 cm and length 19.2 cm in such a manner that the core was wrapped round twice and the paper projected approximately 4 cm on one side. The filter paper was pressed onto the cylinder surface by an elastic latex tube. In an environment saturated with water vapor, the projecting paper was placed in dem. water in such a manner that the end of the paper dipped into the water, but the core was situated above the water surface. After seven hours, the core was unwrapped and weighed to determine $m_{F1}$.

e) Using the equation $$Sw(sp)_{ref} = \frac{m_{F1} - m_1}{m_v - m_1}$$

the reference value for dem. water having spontaneous imbibition $Sw(sp)_{ref}$ was calculated. The spontaneous imbibition describes the displacement of the non-wetting phase by the wetting phase.

f) The sample cores were dried overnight at 90° C.

g) In a similar manner to measure b), the sample cores were impregnated with organopolysiloxane dispersion which contained organopolysiloxanes (A) as active compound for rendering hydrophobic in a 10% strength concentration. To remove excess dispersion, the cores were blasted with nitrogen.

h) The sample cores were dried for 17 h at 90° C. and weighed to determine $m_2$.

i) In a similar manner to measure d), the dry sample cores were wrapped in filter paper strips and placed in dem. water. After seven hours, the core was unwrapped and weighed to determine $m_{F2}$.

j) Using the equation $$Sw(sp)_1 = \frac{m_{F2} - m_2}{m_v - m_1}$$

the spontaneous imbibition $Sw(sp)_1$ after treatment of the cores with dispersion was calculated.

k) The sample cores were dried again at 90° C. Measures i) and j) were carried out again. The procedure was repeated several times.

The 5 organopolysiloxane dispersions below were studied in Examples 1 to 5:

TABLE 1

| Dispersion for Example | FG* in % | Active compound | Emulsifier system/cosolvent |
|---|---|---|---|
| 1 | 39 | 35% of a trimethylsilyl-end-capped PDMS having a viscosity of 12,500 mPa · s | 4% isotridecyl polyglycol ether having 10 EO units<br>Kathon as preservative |
| 2 | 100 | Silicone microemulsion concentrate, prepared by the following process:<br>With stirring, to a mixture of 0.2 g of KOH in 4 g of methanol and 500 g of a hydroxyl-end-capped dimethyl polysiloxane having a mean molecurlar [sic] weight of about 4000 g/mol, 150 g of N-(2-aminoethyl)-3-amino-propyltrimethoxysilane and heat the resulting mixture to reflux for 6 hours; then cool it to 30° C. and mix in 2.5 ml of 10% strength hydrochloric acid. Finally, distill off the methanol by heating to up to 140° C. and free the resulting organopolysiloxane from KCl by filtration. The organopolysiloxane contains 2.9% of basic nitrogen, based on its weight.<br>Mix 40 g of this organopolysiloxane containing basic nitrogen with 5 g of glacial acetic acid, 80 g of the organopolysiloxane of the empirical formula $CH_3Si(OC_2H_5)_{0.8}O_{1.1}$ and of the mean molecular weight of 600 g/mol and 10 g of i-octyltrimethoxysilane and heat the mixture to 90° C., to form a clear mixture. | |
| 3 | 53 | 40% i-octyltriethoxysilane<br>5% of an organopolysiloxane of the empirical formula $CH_3Si(OC_2H_5)_{0.8}O_{1.1}$ having a mean molecular weight of about 650 g/mol and a viscosity of about 20 mPa · s<br>5% of a condensation product of a a,w-dihydroxymethylpolysiloxane having one Si-bonded hydroxyl group at each terminal unit and N(-2-aminoethyl)-3-aminopropyltrimethoxy-silane in the presence of KOH having an amine number of about 0.3, a viscosity of about 1500 mPa · s at 25° C. and a residual methoxy content of less than 5 mol %, based on the methoxy groups initially present in N(-2-aminoethyl)-3-aminopropyltrimethoxysilane | 2.7% Glukopon ® 225 from Henkel KGaA, Düsseldorf, a fatty alcohol C8–C10 glycoside in aqueous solution<br>0.3% Genamin ® 200 from Hoechst AG, Frankfurt, a reaction product of stearylamine and ethylene oxide |

| Dispersion for Example | FG* in % | 0.06 | Emulsifier system/cosolvent |
|---|---|---|---|
| 4 | 50 | 33% of an amino-functional silicone oil of the formula x[1], with the amine number being 0.15, the viscosity 5000 mPa · s and R = OH | 5% diethylene glycol monobutyl ether<br>11% isotridecylpolyglycol ether having 5 EO units<br>1% fatty alochol polyglycol ether having a saturated alkyl group ($C_{16}$–$C_{18}$) and 25 EO units<br>Benzalkylammonium chloride as preservative |
| 5 | 39 | 30% by weight of a trimethylsilyl-end-capped PDMS having a viscosity of 35 mPa · s<br>30% by weight of an end-capped PDM having a viscosity of 150 mPa · s<br>40% by weight of a resin having a ratio of $Me_3SiO_{1/2}/SiO_{4/2}$ of 0.65 and an OH content of about 0.3% by weight and $OC_2H_5$ content of about 2.0% by weight | 8.2% by weight of hexadecyltrimethylammonium chloride<br>0.8% by weight of isotridecylpolyglycol ether having 10 EO units<br>Formaldehyde as preservative |

TABLE 1-continued

*Solids content
EO unit = —(CH$_2$—CH$_2$—O)—
1)Formula x: RSiMe$_2$O [SiMe$_2$O]$_m$ [SiMeR'O]$_n$ SiMe$_2$R
where R' = (CH$_2$)$_3$ NH—CH$_2$—CH$_2$—NH$_2$ The spontaneous imbibition Sw(sp)$_1$ decreases sharply after 1 to 2 days in the case of the cores treated with organopolysiloxane dispersion, since rendering the cores hydrophobic greatly decreases the capillary action for water.

In Table II below, the values for the spontaneous imbibition Sw(sp)$_1$ after different drying times are given as the sum of the drying times in measures h) and k) in comparison with the reference Sw(sp)$_{ref}$.

TABLE II

| | Spontaneous water imbibition S$_w$(sp) after total drying time [days] | | | | | | |
|---|---|---|---|---|---|---|---|
| Example | S$_w$(sp) ref | S$_w$(sp)1 1 | 2 | 5 | 10 | 13 | 17 |
| 1 | 0.64 | 0.06 | — | | | | |
| 2 | 0.67 | 0.07 | — | | | | |
| 3 | 0.58 | 0.05 | 0.04 | 0.06 | — | | |
| 4 | 0.71 | 0.69 | 0.07 | 0.03 | — | | |
| 5 | 0.65 | 0.36 | 0.3 | 0.22 | 0.14 | 0.07 | 0.04 |

Example 6

The spontaneous imbibition SW(SP)$_{ref}$ of a sample core was determined in a similar manner to Example 1 by measures a) to f). Subsequently, the measures below were carried out:

l) The sample core was impregnated with salt water in a similar manner to measure b). The salt water roughly corresponds in salt content to the formation water and contains, per liter, 28.5 g of NaCl, 18.5 g of CaCl$_2$, 1.6 g of MgCl$_2$ and 1.4 g of KCl, in total, 5% salt content.

m) The sample core impregnated with salt water was flooded at 140° C. with the organopolysiloxane dispersion from Example 5 at a rate of 10 ml/h up to constant pressure. About 3 to 4 pore volumes of organopolysiloxane dispersion were used in the course of this treatment.

n) The sample core was kept at 140° C. for 3 days.

o) The organopolysiloxane dispersion was flushed out of the sample core with salt water. The salt water was then displaced with nitrogen.

p) The sample cores were dried by slowly reducing the pressure from 0.44 to 0.1 MPa in 6 h and subsequently keeping them for 17 hours at 90° C. and were weighed to determine m$_3$.

q) In a similar manner to measure d), the dry sample cores were wrapped in filter paper strips and placed in salt water. After seven hours, the core was unwrapped and weighed to determine m$_{F3}$.

r) Using the equation $$Sw(sp)_2 = \frac{m_{F3} - m_3}{m_v - m_1}$$

the spontaneous imbibition Sw(sp)$_2$ was calculated.

s) The sample cores were dried again for 17 h at 90° C. Measures q) and r) were carried out again. The process was repeated several times.

Table III below gives the values for the spontaneous imbibition Sw(sp)$_2$ after different drying times as the sum of the drying times in measures p) and s) in comparison with the reference Sw(sp)$_{ref}$.

TABLE III

| Spontaneous imbibition S$_w$(sp) after total drying time [days] | | |
|---|---|---|
| S$_w$(sp)ref | Sw(sp)2 | |
| | 2 | 17 |
| 0.61 | 0.3 | 0.25 |

The spontaneous imbibition with salt water Sw(sp)$_2$ also decreases sharply after storage at high temperatures in the case of the cores treated with organopolysiloxane dispersion. The capillary action of the salt water is greatly decreased under conditions which prevail in natural gas fields gas fields [sic].

What is claimed is:

1. A process for drying out immobile formation water in rock in the intake radius of natural gas wells and gas storage wells which deliver less than 50 l of water per 1000 m$^3$ (S.T.P.) of natural gas produced, said process comprising contacting said rock with a dispersion comprising the components A) a water-repellent active compound,
B) water as a dispersion medium, and
C) optionally, a dispersant,
wherein said water repellant active compound (A) comprises one or more organosilicon compound(s).

2. A process according to claim 1, in which at least one organosilicon compound (A) is made up of units of the general formulae (I) to (VII)

| | |
|---|---|
| R$_3$SiO$_{1/2}$, | (I) |
| R$_2$SiO, | (II) |
| RSiO$_{3/2}$, | (III) |
| SiO$_{4/2}$, | (IV) |
| R$_2$(R'O)SiO$_{1/2}$, | (V) |
| R(R'O)SiO, | (VI) |
| R'OSiO$_{3/2}$, | (VII) | where
R denotes monovalent hydrocarbon radicals having 1 to 18 carbon atoms, optionally substituted by cyano, amino, alkylamino, quaternary ammonium, mercapto, epoxy, anhydrido, carboxylato, sulfonato, sulfato, phosphonato, isocyanato or polyoxyalkylene groups,
R' denotes monovalent hydrocarbon radicals having 1 to 30 carbon atoms, optionally substituted by halogen atoms, cyano, amino, alkylamino, quaternary ammonium, mercapto, epoxy, anhydrido, carboxylato, sulfonato, sulfato, phosphonato, isocyanato or polyoxyalkylene groups.

3. A process according to claim 1, in which said dispersants (C) comprise sulfonates, alkali salts of carboxylic acids, ammonium salts of carboxylic acids, alkyl polyglycol ethers, alkylaryl polyglycol ethers, or quaternary alkyl- or alkylbenzylammonium salts.

4. A process according to claim 1, in which 5 to 150 parts by weight of dispersant (C) are used per 100 parts by weight of water-repellent active compound (A).

5. A process according to claim 2, in which said dispersants (C) comprise sulfonates, alkali salts of carboxylic acids, ammonium salts of carboxylic acids, alkyl polyglycol ethers, alkylaryl polyglycol ethers, or quaternary alkyl- or alkylbenzylammonium salts.

6. A process according to claim 2, in which 5 to 150 parts by weight of dispersant (C) are used per 100 parts by weight of water-repellent active compound (A).

7. A process according to claim 3, in which 5 to 150 parts by weight of dispersant (C) are used per 100 parts by weight of water-repellent active compound (A).

8. The process of claim 1, wherein the average particle size of the dispersed organopolysiloxane is less than the average pore size of the formation rock.

* * * * *